March 22, 1966
R. L. MEDLEY, JR
3,241,454
CONTOUR AND PROFILING MACHINE
Filed Jan. 2, 1963
5 Sheets-Sheet 1
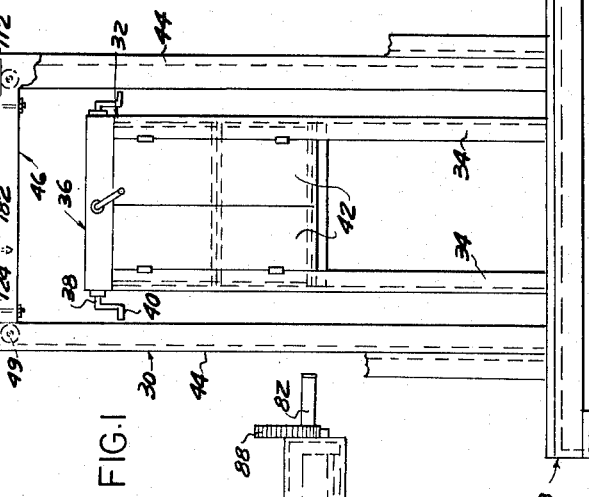
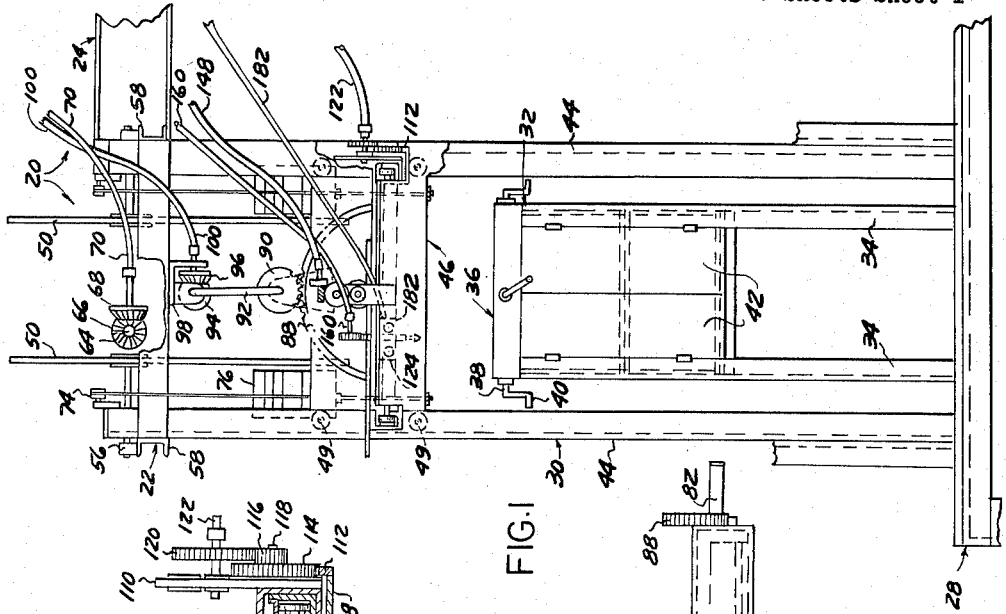
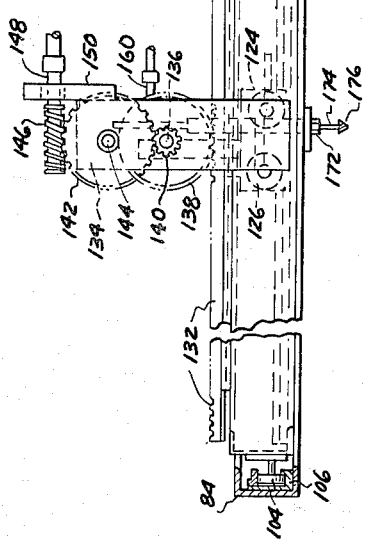
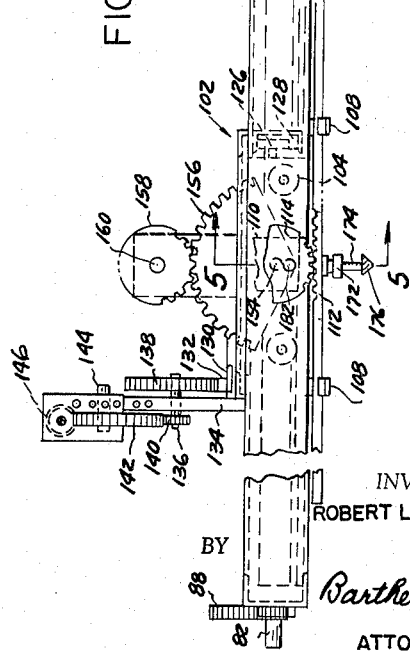
INVENTOR.
ROBERT LEE MEDLEY, JR
BY Barthel & Bugbee
ATTORNEYS March 22, 1966  R. L. MEDLEY, JR  3,241,454
CONTOUR AND PROFILING MACHINE
Filed Jan. 2, 1963  5 Sheets-Sheet 2
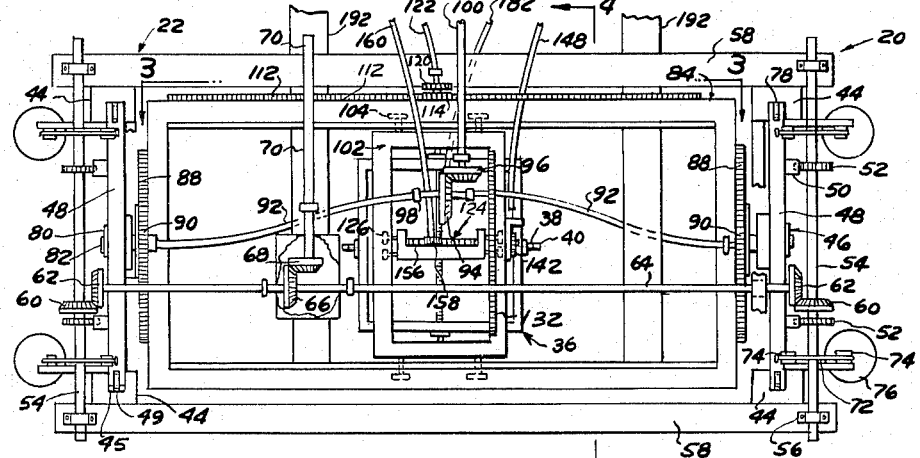
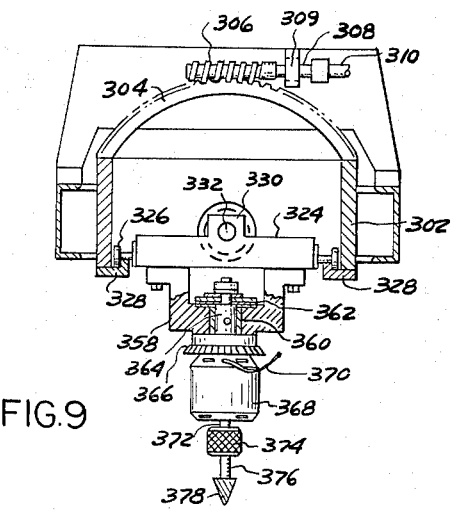
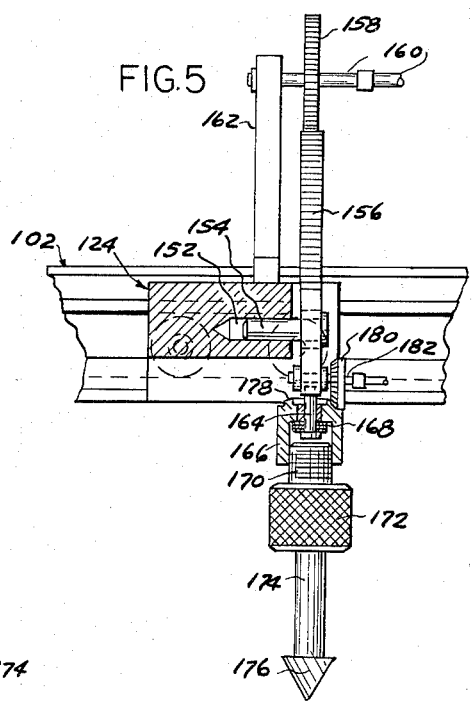
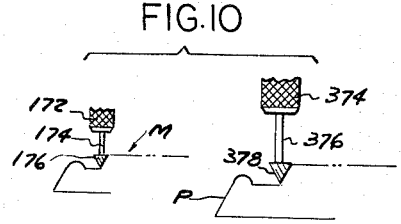
INVENTOR.
ROBERT LEE MEDLEY, JR.
BY
Barthel & Bugbee
ATTORNEYS March 22, 1966  R. L. MEDLEY, JR  3,241,454
CONTOUR AND PROFILING MACHINE
Filed Jan. 2, 1963  5 Sheets-Sheet 3
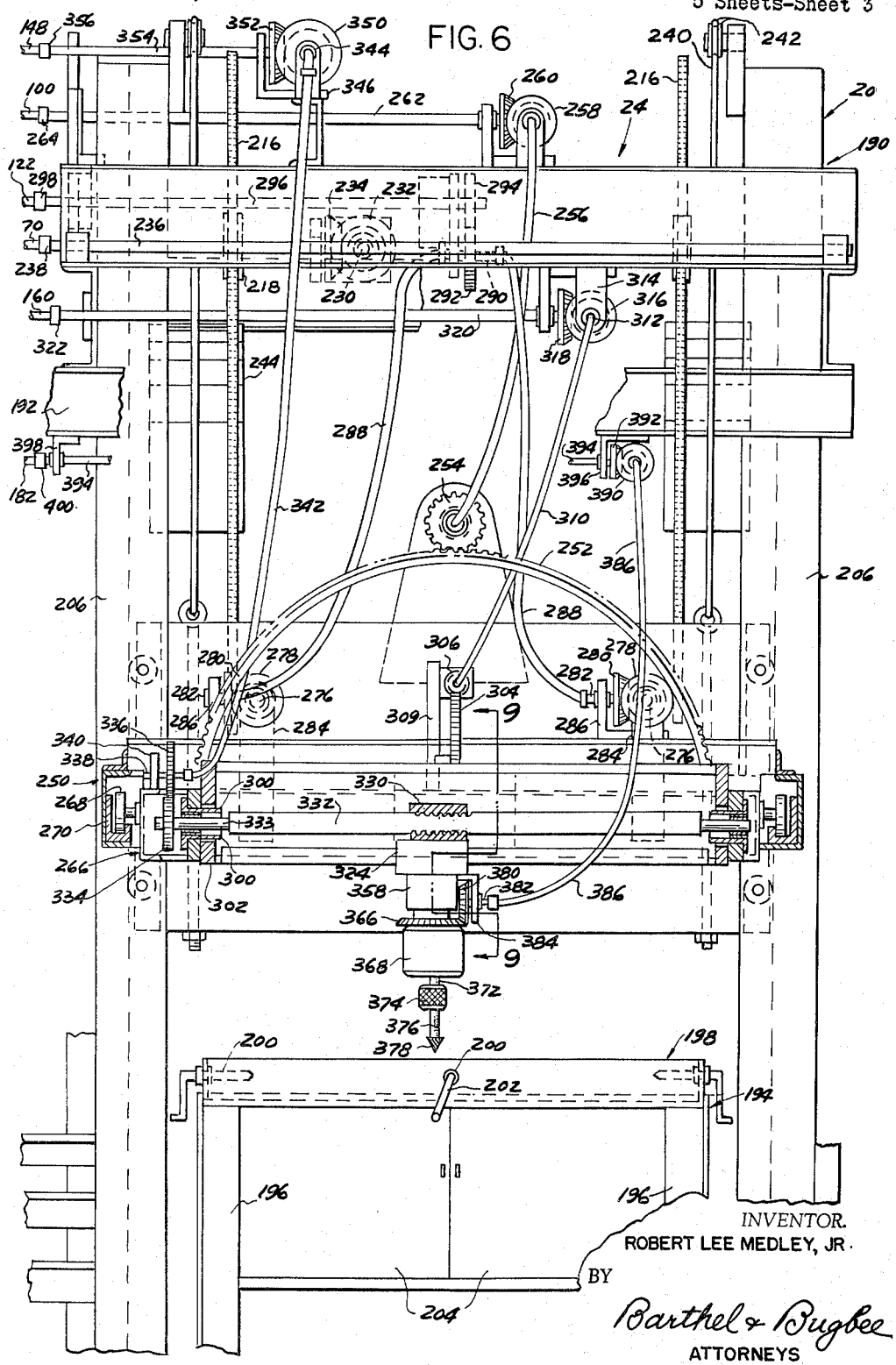

March 22, 1966  R. L. MEDLEY, JR  3,241,454
CONTOUR AND PROFILING MACHINE
Filed Jan. 2, 1963  5 Sheets-Sheet 4

INVENTOR.
ROBERT LEE MEDLEY, JR
BY
*Barthel & Bugbee*
ATTORNEYS

United States Patent Office 3,241,454
Patented Mar. 22, 1966

3,241,454
CONTOUR AND PROFILING MACHINE
Robert Lee Medley, Jr., 18451 St. Marys St.,
Detroit, Mich. 48235
Filed Jan. 2, 1963, Ser. No. 248,946
13 Claims. (Cl. 90—13)

This invention relates to contour and profile cutting machines and, in particular, to such machines employing master templates or models.

Hitherto, patterns or dies have been made from models previously constructed upon a smaller scale after approval by the management. This has been especially true in the automotive industry where the styling department prepares quarter-size models of the automobile bodies proposed to be constructed for future production. These models are frequently made of clay and are altered by hand until the desired configuration is obtained and approved by the management. It is then necessary to provide patterns and dies on the full scale to reproduce the parts for production. Often such parts are of identical but opposite configuration, such as, for example, dies for a right-hand and a left-hand fender, either front or rear. It has hitherto been necessary to prepare models of both the right-hand and left-hand fenders, even though they are exact opposites of one another. The present invention solves this problem by enabling the exact contour or configuration of the small model to be reproduced upon any desired scale, with a single model of one hand (either right-hand or left-hand) sufficing to reproduce a pattern either of the same size or enlarged simultaneously in both right-hand and left-hand arrangements.

Accordingly, one object of this invention is to provide a contour and profile cutting machine having a rotary cutter which substantially exactly reproduces the contour or profile of a model traced by a feeler which is moved around the model while in contact therewith while the motion-transmitting mechanism of the machine causes the cutter to produce the contour or profile of the model upon a desired scale, preferably an enlarged scale.

Another object is to provide a contour and profile cutting machine of the foregoing character which will cut a right-hand pattern or part from a left-hand model, or a right-hand part from a right-hand model, or both a right-hand and left-hand pattern or part from either a single right-hand or left-hand model, where such parts are exact duplicates either of the same hand or opposite hand, as the case may be.

Another object is to provide a contour and profile cutting machine of the foregoing character wherein the feeler and the cutter are mounted upon carriages which are capable of longitudinal and lateral motion, as well as movable vertically in order for the feeler to exactly trace out the contours of the model, in response to which the cutter reproduces those contours upon any desired scale within the limits of the machine, such as from 1 to 10 times the size of the model.

Other objects and advantages of the invention will become apparent during the course of the following description of the accompanying drawings, wherein:

FIGURE 1 is a front elevation of the contour and profile tracing unit of a contour and profile cutting machine, with the top central portion and midportion broken away to reveal the construction behind them, and showing flexible shaft connections to the corresponding mechanism assemblies of the pattern cutting unit of FIGURE 6;

FIGURE 2 is a top plan view of the tracing unit shown in FIGURE 1;

FIGURE 3 is an enlarged front elevation, partly in section along the line 3—3 in FIGURE 2, of the horizontal main carriage of the tracing unit shown in FIGURES 1 and 2;

FIGURE 4 is an enlarged side elevation, partly in section, along the line 4—4 in FIGURE 2, of the horizontal longitudinal carriage of FIGURE 3, showing the horizontal cross carriage slidably mounted therein and carrying the tracing feeler;

FIGURE 5 is an enlarged fragmentary vertical section taken along the line 5—5 in FIGURE 3, showing the tracing feeler and its tiltable mounting;

FIGURE 6 is a front elevation of the contour and profile cutting unit of a contour and profile cutting machine with the central portion in vertical section along the line 6—6 in FIGURE 8, showing the flexible shaft connections to the tracing unit of FIGURE 1, certain structural parts being broken away to reveal the construction behind them;

FIGURE 9 is a vertical cross-section taken along the line 9—9 in FIGURE 6 showing the tiltable mounting of the rotary pattern cutter and its driving mechanism connected to the tiltable mounting of the tracing feeler of FIGURE 5; and FIGURE 10 is a diagrammatic comparative view showing the tracing feeler engaging the model and the reproducing cutter engaging and cutting the pattern or part upon an enlarged scale in proportionate correspondence to the model.

*General arrangement*

Figure 7:
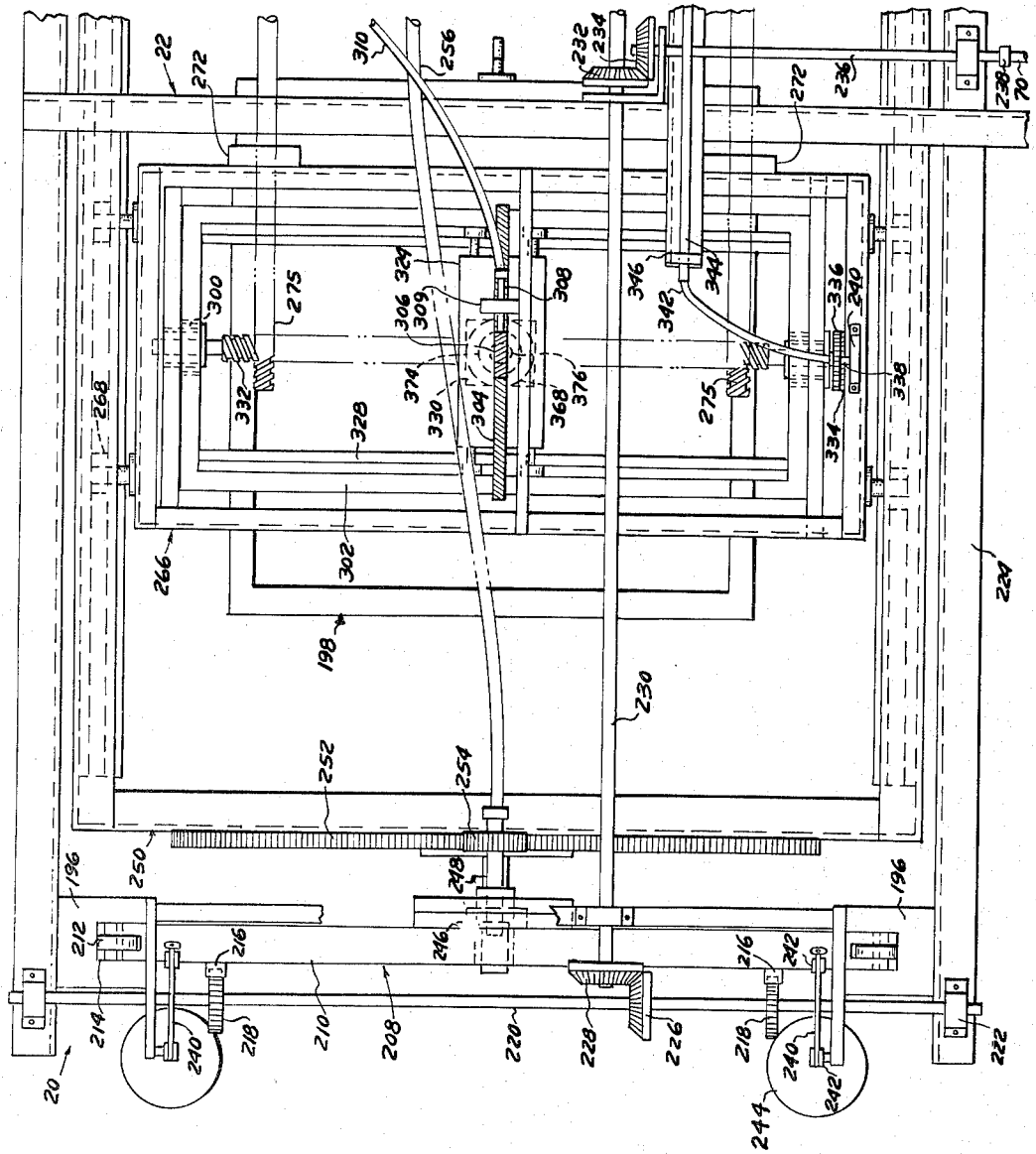
FIGURE 7 is a top plan view of the rearward portion of the cutting unit of the machine but on a slightly larger scale to bring out details of construction more clearly.
Figure 8:
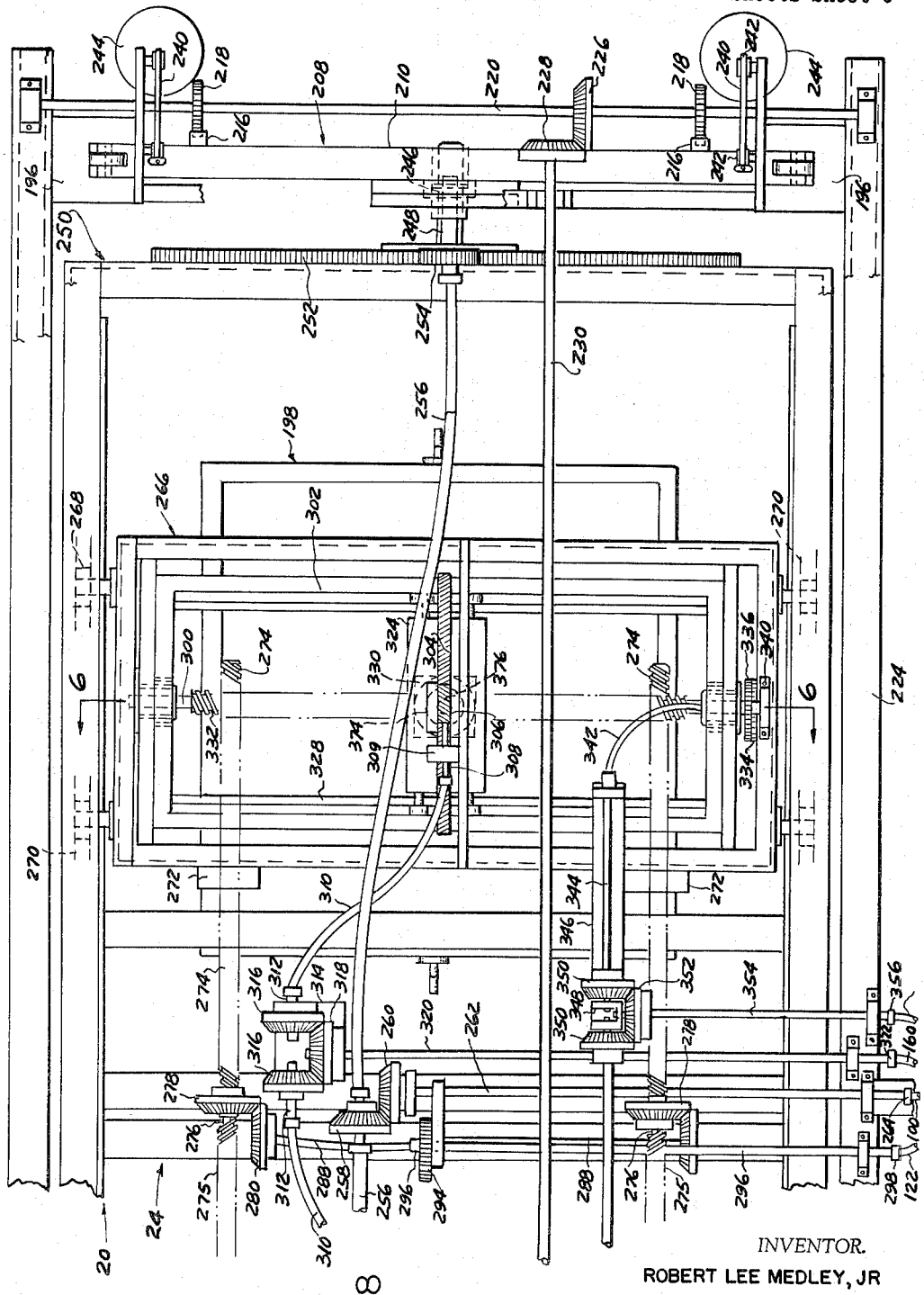
FIGURE 8 is a top plan view of the forward portion of the cutting unit of the machine, forming a continuation of FIGURE 7 and on the same slightly larger scale.

Referring to the drawings in detail, FIGURES 1 and 6 shown in front elevation and FIGURES 2, 7 and 8 in top plan view, a contour and profile cutting machine, generally designated 20, according to one form of the invention as including a tracing unit, generally designated 22 (FIGURES 1 and 2) and a cutting unit, generally designated 24 (FIGURES 6, 7 and 8). The tracing unit 22 and the cutting unit 24 are too large to be shown together upon a single sheet of drawings, but their connections by flexible shafts are shown in front elevation at the upper right-hand corner of FIGURE 1 and upper left-hand corner of FIGURE 6, and in top plan view at the top of FIGURE 2 and bottom of FIGURES 7 and 8, as described in more detail below. It will be seen from the subsequent description that the cutting unit 24 operates in exact correspondence to the tracing unit 22, either upon the same scale or upon an enlarged scale, to carve out a pattern or part P which is substantially identical in the proportions of its configuration as the model M (FIGURE 10), excepting that it usually differs in size, and even then the corresponding dimensions are in exact proportions to one another. The tracing unit 22 is of smaller size and lesser height than the cutting unit 24, hence their illustrations in the drawings are of different sizes although drawn on the same scale. The reason for this is that the pattern to be reproduced is usually larger than the model traced.

*Tracing unit construction*

Referring to FIGURES 1, 2, 3 and 4, the machine 20 includes a frame structure 26 having a common base 28 for both the tracing unit 22 and cutting unit 24, the common base 28 being omitted in FIGURE 6 to enable the showing of the cutting unit on a larger scale. Rising from the common base 28 is a tracing unit structure, generally designated 30, and a model-supporting structure, generally designated 32. The model supporting structure 32 consists of four uprights 34 arranged at the four corners of a rectangle and carrying at its upper end a hollow rectangular model-holding frame 36, the four sides of which are bored and threaded at their midpoints to receive screwshafts 38 which are rotated by hand cranks 40 to move the screw shafts 38 inward or outward in order to clamp or remove a model placed within the frame 36. Mounted on two of the uprights 34 below the model holding frame 36 are hinged doors 42 providing access to the space below the model holding frame 36.

Also rising from the base 28 at the four corners of a rectangle spaced outwardly from the uprights 34 are channel uprights 44, the channels 45 of which form vertical guideways for the vertical travel of a counterbalanced tracing unit main carriage, generally designated 46 and consisting of two horizontally-spaced cross bars 48 (FIGURE 2) carrying end rollers 49 engaging the guide channels 45. Each cross bar 48 carries a pair of laterally-spaced toothed racks 50 which mesh with pinions 52 keyed or otherwise drivingly connected to horizontally-spaced cross shafts 54. The cross shafts 54 are journaled as at 56 on upper horizontal channel members 58 interconnecting the upper ends of the channel uprights 44. Keyed or otherwise drivingly secured to the cross shafts 54 in horizontal alignment with one another (FIGURE 2) are bevel gears 60 with which mesh bevel gears 62 keyed or otherwise drivingly connected to a longitudinal shaft 64. By this means the cross bars 48 are prevented not only from rocking laterally relatively to one another but also are maintained at the same level as they rise and fall in the tracing of the model M (FIGURE 10) to produce the pattern or part P. Keyed or otherwise drivingly secured to the longitudinal shaft 64 intermediate the bevel gears 62 at its opposite ends is a bevel gear 66 (FIGURES 1 and 2) which meshes with a bevel gear 68 keyed or otherwise drivingly secured to a partially flexible vertical motion output shaft 70, the connections of which to the cutting unit 24 of FIGURES 6, 7 and 8 and will be subsequently described.

Connected to the opposite ends of the cross bars 48 at the four corners of the tracer main carriage 46 (FIGURE 2) are the inner ends of counterbalance cables 72, the intermediate portions of which pass over pulleys 74 (FIGURE 1) rotatably mounted on the tracing unit frame structure 30 whence the cables 72 descend to connections at their outer ends with main tracing carriage counterbalancing weights 76. Mounted on the midportions of the cross bars 48 are aligned pivot bearings or trunnions 80 in which are pivotally mounted pivot shafts 82 (FIGURE 3) which are connected at their inner ends to the opposite outer ends of an open-centered rectangular rocking channel frame or outer tracing carriage, generally designated 84. Mounted on the opposite ends of the rocking outer tracing carriage 84 are upstanding semi-circular gears or arcuate rack bars 88. Meshing with the semi-circular gears or rack bars 88 are pinions 90 keyed or otherwise drivingly connected to the outer ends of flexible shafts 92, to the coupled inner ends of which is keyed or otherwise drivingly secured a bevel gear 94. The bevel gear 94 meshes with a bevel gear 96, both being mounted upon an angle bracket structure 98 (FIGURE 1). Keyed or otherwise drivingly secured to the bevel gear 96 is a partially flexible outer carriage tilt-transmitting output shaft 100, the opposite end of which is connected to the cutting unit 24 in a manner subsequently described below.

Longitudinally slidably mounted within the open center of the rocking channel frame 84 is a smaller open-centered rectangular longitudinally-travelling frame or intermediate carriage 102 (FIGURE 2) which carries rollers 104 at its opposite ends running in bearing channels 106 secured to the outer rocking frame 84 (FIGURE 4). Secured to and depending from the longitudinally-travelling frame 102 adjacent the roller 104 on one end thereof are longitudinally-spaced L-shaped angle brackets 108 extending beneath and outwardly beyond the outer channel frame 84 upon which is mounted an upstanding bearing bracket or shaft support 110 (FIGURES 1, 2 and 4). Mounted on the outer ends of the angle brackets 108 is an elongated toothed rack 112. Meshing with the rack 112 is a gear 114 integral with which is a pinion 116, both being loosely and rotatably mounted on a shaft 118 supported by the support 110. Meshing with the pinion 116 is a gear 120 which is keyed or otherwise secured to a partially flexible intermediate carriage output shaft 122 which is journaled in the upstanding bracket 110 (FIGURE 4). The connections of the intermediate carriage output shaft 122 to the cutting unit 24 will be subsequently described below.

Mounted within the open-centered intermediate carriage 102 for travel laterally therein is an inner cross carriage 134 (FIGURES 1, 3 and 4) having rollers 126 mounted at its opposite ends and running in channel bearing bars 128 (FIGURE 3) secured inside the channel frame or intermediate carriage 102. Secured to and extending forwardly from the forward end of the inner carriage 124 is an angle bracket plate 130 (FIGURE 3) extending out over the intermediate carriage 102 and carrying on its forward upper end a rack bar 132 which travels with the inner cross carriage as it moves laterally to and fro within the intermediate longitudinal carriage 102. Secured to the forward side of the latter is an upstanding bracket 134 (FIGURE 3) in which is journaled a shaft 136. Keyed to the rearward end of the shaft 136 is a gear 138 meshing with the rack 132, while on its opposite end is keyed a pinion 140 meshing with a helical gear 142 (FIGURES 3 and 4) loosely and rotatably mounted upon a shaft 144 supported by the upstanding bracket 134. Meshing with the helical gear 142 is a helical gear 146 on a partially flexible cross carriage output shaft 148 having its axis perpendicular to the axis of the shaft 144 and journaled in the upper end of a bracket extension 150 secured to the bracket 134 on one side of its upper end (FIGURE 4). In this manner, the lateral travel of the inner cross carriage 124 is conveyed to the output shaft 148 and thence to the cutting unit 24 in a manner subsequently described below.

Formed in the inner cross carriage 124 (FIGURE 8) is a horizontal transverse bore or socket 152 is which is seated the inner end of a headed pivot shaft 154. Pivotally mounted upon the pivot shaft 154 for swinging motion forward and backward is a sector gear 156 (FIGURES 3 and 5). Meshing with the sector gear 156 is a gear 158 keyed or otherwise drivingly secured to a partially flexible feeler tilt output shaft 160 journaled in an upstanding bracket 162 rising from the carriage 124. Mounted in the web of the gear 156 below the pivot shaft 154 and extending perpendicularly downward therefrom is a headed stationary shaft 164 (FIGURE 5) upon which is rotatably mounted an end-toothed internally-threaded cup-shaped adapter 166. Secured within the adapter 166 are thrust bearings 168, and threaded into the internally-threaded adapter 166 is the externally-threaded shank 170 of a knurled feeler chuck 172 adapted to receive and clamp a feeler 174 having a contact head 176 preferably of conical shape to fit and trace the contours of the beveled model M (FIGURE 10) but otherwise suitably shaped to fit differently-shaped models.

Meshing with the bevel gear portion 178 on the upper end of the adapter 166 (FIGURE 5) is a bevel gear 180 keyed or otherwise drivingly secured to a partially flexible feeler rotation output shaft 182 journaled in the lower end of the web of the quadrant gear 156 below its pivotal mounting on the pivot shaft 154. In the manner described below, this mechanism enables manual rotation of the feeler chuck 172 to be transmitted to the cutter mount, so as to facilitate inserting the feeler 174 into otherwise inconveniently-accessible recesses and to trace the configuration thereof and transmit its rotation to the cutter mount.

*Cutter unit construction*

The cutter unit 24 (FIGURES 6, 7, 8 and 9) also includes an upright cutting unit frame structure, generally designated 190, rising from the common base 28 (omitted from FIGURE 6 to conserve space), and connected for the sake of rigidity by cross beams 192 to the tracing unit frame structure 30, which is considerably lower in height. Also rising from the common base 28 in a manner similar to that of the model-supported structure 32 of FIGURE 1 are two identical pattern or part supporting structures 194 for holding right-hand and left-hand patterns or parts P and P' respectively. Each pattern supporting structure 194 consists of four uprights 196 (FIGURE 6) arranged at the four corners of a rectangle and carrying at its upper end a hollow rectangular pattern or part holding frame 198, the four sides of which are bored and threaded at their midpoints to receive screw shafts 200 which are rotated by hand cranks 202 to move the screwshafts 200 inward or outward in order to clamp or remove a pattern placed within the frame 198. Mounted on two of the uprights 196 below each pattern-holding frame 198 are hinged doors 204 providing access to the space below the pattern-holding frames 198.

The cutter unit frame structure 190 includes four channel uprights 206 mounted outside the uprights 196 of the pattern supporting structure 194, the inwardly-facing channels of which form vertical guideways for the vertical travel of a counterbalanced cutter main carriage, generally designated 208 and consisting of two horizontally-spaced cross bars 210 (FIGURES 7 and 8) carrying end rollers 212 which roll while traveling upward and downward within the guide channels 214 of the channel uprights 196. Secured to and rising from each cross bar 210 near the opposite ends thereof is a pair of laterally-spaced toothed racks 216 which mesh with pinions 218 keyed or otherwise drivingly connected to horizontally-spaced cross shafts 220. The cross shafts 220 are journaled in bearings 222 on upper horizontal channel side members 224 interconnecting the upper ends of the channel uprights 196.

Keyed or otherwise drivingly secured to the cross shafts 220 in horizontal alignment with one another are bevel gears 226 with which mesh bevel gears 228 which are keyed or otherwise drivingly connected to a longitudinal shaft 230. In this manner, the cross bars 210 are prevented not only from rocking laterally relatively to one another but also are maintained at the same level as they rise and fall while responding to the rise and fall of the tracing unit main carriage 46 in cutting the contours of the pattern or part P corresponding to the model M. Keyed or otherwise drivingly secured to the longitudinal shaft 230 intermediate the bevel gears 228 at its opposite ends is a bevel gear 232 (FIGURE 7) which meshes with a bevel gear 234 keyed or otherwise drivingly secured to a vertical motion input shaft 236 coupled at 238 to the partially flexible vertical motion output shaft 70 of the tracing unit 22.

Connected to the opposite ends of the cross bars 210 at the four corners of the cutter main carriage 208 are the inner ends of counterbalance cables 240 (FIGURES 7 and 8), the intermediate portions of which pass over pulleys 242 rotatably mounted on the cutting unit frame structure 190 whence the cables 240 descend to connections at their outer ends with main cutting carriage counterbalancing weights 244. Mounted on the midportions of the cross bars 210 of the main cutting carriage 208 are aligned pivot bearings 246 in which are pivotally mounted pivot shafts 248 which are connected at their inner ends to the opposite outer ends of an open-centered rectangular rocking channel frame or outer cutting carriage, generally designated 250 (FIGURES 7 and 8). Mounted on the opposite ends of the rocking outer cutting carriage 250 are upstanding semi-circular gears or arcuate racks 252 with which mesh pinions 254 keyed or otherwise drivingly secured to the outer ends of flexible shafts 256, to the coupled inner ends of which is keyed or otherwise drivingly secured a bevel gear 258 (FIGURE 8). Meshing with the bevel gear 258 is a bevel gear 260 keyed or otherwise drivingly secured to an outer carriage tilt-transmitting input shaft 262, the outer end of which is coupled as at 264 to the tracing unit tilt-transmitting output shaft 100.

Longitudinally slidably mounted for independent motion within the open center of the cutting unit rocking channel frame 250 are two smaller open-centered rectangular lonigtudinal frames or intermediate cutting carriages, generally designated 266, disposed above their respective pattern holding frames 198. Each intermediate carriage 266 at its opposite ends carries rollers 268 running in bearing channels 270 (FIGURE 6) secured to the outer rocking frame 250. The frames 266 are moved back and forth within the rocking farme 250 by means of two pairs of laterally-spaced oppositely-internally-threaded blocks or nuts 272 mounted on the inner or nearer sides of the frames 266 (FIGURES 7 and 8) and engaged by the corresponding oppositely-threaded portions 274 and 275 of two parallel longitudinal screw shafts or lead screws 276 upon each of which a bevel gear 278 is keyed or otherwise drivingly secured (FIGURES 7 and 8). Meshing with the bevel gears 278 are bevel gears 280 keyed or otherwise drivingly secured to stub shafts 282 (FIGURE 6), brackets 284 and 286 being provided for rotatingly supporting the screw shafts 276 and stub shafts 282 respectively.

Drivingly connected to the stub shafts 282 are flexible shafts 288, the upper ends of which are drivingly connected to a stub shaft 290 upon which is drivingly mounted a gear 292 (FIGURE 6). Meshing with the gear 292 is a gear 294 which is keyed or otherwise drivingly secured to the inner end of an intermediate carriage input shaft 296 which is coupled at 298 to the intermediate carriage output shaft 122 of the tracing unit 22 (FIGURE 6). In this manner, the intermediate carriages 266 move back and forth within the rocking frame 250 in synchronism with the back and forth motion of the intermediate carriage 102 of the tracing unit 22.

Pivotally mounted in the opposite ends of the intermediate carriages 266 are flanged tubular pivot bushings 300 (FIGURE 6) upon which open-centered rectangular inner frames 302 are rockably mounted. Rigidly mounted at the approximate midpoints of the inner frames 302 are semi-circular gears 304 with oppositely-inclined teeth bridging the opposite sides of the channel frames 302. Meshing with the semi-circular gears 304 are oppositely-inclined toothed worms 306 mounted on and driven by stub shafts 308 rotatably mounted in brackets 309. The inner ends of the stub shafts 308 are drivingly connected (FIGURE 10) to flexible shafts 310 which in turn approach one another and are drivingly connected to aligned stub shafts 312 (FIGURE 8) rotatably mounted on a bracket structure 314 (FIGURE 6). Keyed or otherwise drivingly connected to the shafts 312 are bevel gears 316, both of which mesh with opposite sides of a common bevel gear 318 keyed or othewise drivingly connected to a cutter tilt input shaft 320 which is rotatably supported upon the frame structure 190 and at its outer end is coupled at 322 to the partially flexible feeler tilt output shaft 160.

Laterally slidably mounted for travel to and fro within the inner channel frame 302 are cutter cross carriages 324 (FIGURES 6, 7, 8 and 9), each cross carriage 324 having at its opposite ends rollers 326 traveling in angle bearing rails 328 secured to the bottoms of the frames 302 (FIGURE 10). Each cross carriage 324 is provided with an upstanding internally-threaded portion 330 threadedly engaged by a screw shaft or lead screw 332. The screw shafts 332 are threaded in the same directions so that their respective cross carriages 324 move at the same rates in the same directions when the screw shafts 332 are rotated. The outer ends 333 of the screw shafts 332 are rotatably mounted in the flanged tubular pivot bushings 300 and at one end carry gears 334 drivingly connected thereto. Meshing with the gears 334 are gears 336, the gears 336 being directly above the gears 334 (FIGURES 6, 7 and 8). The gears 336 are keyed or otherwise drivingly connected to stub shafts 338 rotatably mounted in brackets 340 which in turn are mounted on the intermediate frames 266. Coupled to the inner ends of the stub shafts 340 are the lower ends of flexible shafts 342 which at their upper ends are drivingly connected to aligned longitudinal shafts 344. The shafts 344 are journaled in bearing brackets 346 and on their adjacent ends, which are additionally supported by a U-shaped bracket 348, are drivingly secured bevel gears 350 (FIGURE 8). Meshing simultaneously with the bevel gears 350 is a common bevel gear 352 which in turn is keyed or otherwise drivingly secured to a cutter cross-carriage motion input shaft 354 journaled in the top of the frame structure 190 and coupled at 356 (FIGURE 6) to the cross-carriage output shaft 148 of the tracing unit 22.

Bolted or otherwise secured to the bottom of each cross carriage 324 (FIGURE 9) is a U-shaped hanger bracket 358 which is bored vertically in line with the axis of the screw shaft 332 to receive radial and thrust bearings 360 and 362 respectively which rotatably support a cutter shaft 364 having an integral bevel gear 366 on the lower end thereof to which is bolted the upper end of a vertical electric cutting motor 368 which is supplied with electric power through a flexible cable 370 (FIGURE 9). Extending downwardly from each electric motor 368 is a vertical motor shaft 372 carrying on its lower end a chuck 374 in which is inserted a cutter 376 having a suitable cutting head 378 corresponding in configuration to the tracer head 176 (FIGURES 5 and 10).

Meshing with each bevel gear 356 is a bevel gear 380 (FIGURE 6) keyed or otherwise drivingly secured to a stub shaft 382 journaled in an angle bracket 384 bolted to the hanger bracket 358. Coupled to the outer end of each stub shaft 382 is a flexible shaft 386. The flexible shafts 386 (FIGURE 11) are coupled at their upper ends to stub shafts 388 carrying opposing bevel gears 390 drivingly connected thereto. Meshing with both bevel gears 390 is a common bevel gear 392 (FIGURE 6) mounted on one end of a shaft 394 rotatably supported at its opposite ends in angle brackets 396 and 398 and coupled as at 400 to the partially flexible feeler rotation output shaft 182.

*Operation*

In the operation of the invention, let it be assumed that the moving parts are in the positions shown in the figures of the drawings and that a model M (FIGURES 10) is placed in the model holding frame 36 (FIGURE 1). A pair of patterns or part blanks P which are to be shaped in right-hand or left-hand correspondence with the contours of the model M are placed in the pattern holding frames 198 and that these are clamped in position by means of the cranks 40 and 2—2 respectively (FIGURES 1 and 6). The cutting motors 368 (FIGURES 6, 7, 8 and 10) are then started, rotating the cutters 376. The operator then grasps the feeler chuck 172 (FIGURES 3, 4 and 5) and pulls downward upon it while moving at horizontally until the head 176 of the feeler 174 engages the desired starting position on the model M (FIGURE 10). As he does this, he automatically pulls the main tracer carriage 46 downward toward the model-holding frame 36 (FIGURE 1), at the same time moving the tracer inner cross-carriage 124 and intermediate carriage 102 along their respective guideways 328 (FIGURE 10) and 106 (FIGURE 4) while the feeler head 176 is being brought to its desired location. Meanwhile, any tilting required for the feeler 174 is accomplished by swinging the feeler chuck 172 and its adapter 166 around the pivot shaft 154 as an axis (FIGURE 5) while swinging the outer rocking channel frame 84 around its pivot shafts 82 (FIGURE 3). The operator, while still grasping the feeler chuck 172 and adapter 166 in his hands, then moves the feeler head 176 around the model M while keeping the head 176 in contact with the model. As this occurs, the various carriages of the tracer unit 22 just described automatically adapt themselves to the changing position inclination of the feeler 174.

While the operator is moving the feeler head 176 around the model M in the above manner (FIGURE 10), the motions thereof are being transmitted automatically and responsively to the cutter heads 378 through the motion-transmitting mechanism described above operating in the following manner. The tilting of the feeler 174 of the tracing unit 22 around its pivot shaft 154 (FIGURES 3 and 4) is transmitted to correspondingly tilt the cutters 376 around their respective pivots 333 by the transmission of motion from the arcuate sector gear 156 (FIGURE 3) through the gear 158, partially flexible shaft 160, shaft 320, gearing 318, 316, flexible shafts 310, worms 306 (FIGURES 6, 7, 8 and 9), sector worm gears 304 and channel frames 302, tilting these around their respective pivots 333. Any rotary motion of the feeler 174, chuck 172 and adapter 166 (FIGURE 5) is transmitted through the bevel gears 178 and 180, partially flexible shaft 182, shaft 394, gearing 392, 390, (FIGURES 6, 7 and 8), flexible shafts 386 and bevel gearing 380 and 366 to the motor 368, rotating it in conformity with the rotation of the feeler chuck 172.

Lateral travel of the inner frame or carriage 124 along the intermediate frame 102 is transmitted through the lateral motion of the rack 132 rotating the gearing 138, 140, 142, 146 and the partially flexible shaft 148, the shaft 354 (FIGURE 6), gearing 352, 350, flexible shafts 342, gearing 336, 334 and screwshafts 332 to move the threaded portions 330 of the cutter carriage 324 laterally. Longitudinal motion of the intermediate carriage 102 along the outer carriage 84 is transmitted through the rack 112 connected to the intermediate carriage 102 by the brackets 108 through the gearing 114 (FIGURES 3 and 4), 116 and 120 by way of the partially flexible shaft 122 through the shaft 296 (FIGURE 6), gearing 294, 292, flexible shaft 288, gearing 280 and 278, screwshafts 276 and threaded nuts 272, consequently moving the two cutter outer carriages 266 along the rocking carriage 250 (FIGURES 7 and 8) in opposite directions because of the opposite threading of the opposite end portions 274 and 275 of the screwshafts 276.

Any rocking action of the outer frame 84 of the tracer unit 22 around the pivot shaft 82 (FIGURE 2) causes consequent rocking of the semi-circular gears or racks 88, rotating the gears 90, this rotary motion being transmitted through the flexible shaft 92, the gears 94, 96, the partially flexible shaft 100, the shaft 100, the shaft 262 (FIGURE 6), the gearing 260 and 258, the flexible shafts 256, the pinions 254 and the semi-circular gears or arcuate racks 252, correspondingly rocking the rocking outer cutter carriage 250 around its pivot shafts 248 (FIGURES 7 and 8).

Finally, any rising or falling motion of the main tracing carriage 46 (FIGURE 1) up and down the channel uprights 44 is transmitted through the vertical racks 50 attached thereto and moving therewith, the gears 60 and 62 (FIGURE 2), the shaft 64, the gears 66 and 68, the partially flexible shaft 70, the shaft 236 (FIGURES 6, 7 and 8), the gears 234 and 232, the shaft 230, the gears 228 and 226, the shaft 220, the gears 218 to the vertical racks 216 mounted on the cutter main carriage 208, causing a corresponding rise or fall thereof and carrying with it the carriages 250, 266 and 324 supported thereby.

In the above-described manner and mode of operation, therefore, every motion imparted to the feeler head 176 (FIGURES 5 and 10) while it is held against and passed around the model M in its tracing action is transmitted faithfully to the rotary cutters 376 and cutter heads 378 being rotated by the electric motors 368 (FIGURE 9), so that the cutter heads 378 exactly cut right-hand and left-hand reproductions of the model M. These reproductions may be of the same size where the gear ratios are one-to-one, or as is most usual, of larger size produced by higher gear ratios in order to create an enlarged pattern P of proportionate configuration to the model M in a desired ratio corresponding to the ratio of the various gearing. The establishment of such gearing ratios is well known to mechanical engineers and others skilled in the machine art and hence requires no additional explanation. For the pattern P to be exactly proportionate to the model M, the ratios of the various transmission gearing described above will be the same.

The means for rotating the cutter shaft 364 by the bevel gears 366 and 380 in response to the manual rotation of the feeler chuck 172 and its bevel gears 166 and 180 and shaft 182 are not ordinarily employed for symmetrical drilling or cutting by means of the rotary cutter 376 because the cutter 376 is itself rapidly rotating on the same axis as the above-mentioned means which rotates the motor 368 bodily. This rotating mechanism is used when the cutter 376 is replaced by an angle cutter or slotted or when the motor shaft 372 and cutter 376 are offset relatively to the axis of the cutter shaft 364. In such instances, the tracer rotation by following a model with recesses off-center or with slots reproduces these recesses or slots by indexing the motor shaft 372 and its angle cutter or slotter, as the case may be. Such an angle drilling attachment may consist, for example, of a bevel gear on the cutter shaft meshing with a bevel gear on the lower end of the motor shaft 372 so that the cutter rotates on an axis at right angles to the axis of the motor shaft 372.

What I claim is:

1. A contour-reproducing apparatus for cutting a pattern proportionately corresponding to a traced model, said apparatus comprising
a sustaining structure having laterally-spaced parallel vertical tracer and cutter elevator guideways thereon,
a traced elevator and a cutter elevator mounted for vertical travel along said tracer and cutter elevator guideways respectively,
vertical motion-transmitting mechanism operatively connecting said tracer elevator to said cutter elevator for converting the vertical motion of said tracer elevator to vertical motion of said cutter elevator in a predetermined ratio,
model tracer and pattern cutter carrying means mounted respectively upon said tracer and cutter elevators for horizontal longitudinal and lateral motion relatively thereto,
a model tracer and a power-driven pattern cutter mounted on said tracer carrying means and on said cutter carrying means respectively,
a model holder and pattern holder disposed beneath said tracer and cutter respectively,
and horizontal motion-transmitting mechanism operatively connecting said tracer-carrying means to said cutter-carrying means for converting the horizontal motion of said model tracer to horizontal motion of said pattern cutter in said same predetermined ratio, said horizontal motion-transmitting mechanism including gearing operatively connected to said tracer-carrying means and cutter-carrying means respectively and flexible shafting drivingly interconnecting said gearing.

2. A contour-reproducing apparatus, according to claim 1, wherein said model tracer and pattern tracer are tiltably mounted on said tracer and cutter carrying means for angular tilting motion relatively to their respective elevators, and
wherein angular motion-transmitting mechanism operatively connects said tracer to said cutter for converting the tilting motion of said tracer to equivalent tilting motion of said cutter, said angular motion-transmitting mechanism including gearing operatively connected to said tracer and cutter respectively and flexible shafting drivingly interconnecting said gearing.

3. A contour-reproducing apparatus, according to claim 2, wherein said carrying means includes outer supporting frames tiltably mounted on their respective elevators, and
wherein said angular motion-transmitting mechanism operatively interconnects said outer supporting frames.

4. A contour-reproducing apparatus, according to claim 2, wherein said carrying means also includes intermediate supporting frames horizontally slidably mounted on their respective elevators, and wherein said horizontal motion-transmitting mechanism operatively interconnects said intermediate supporting frames.

5. A contour-reproducing apparatus, according to claim 4, wherein said horizontal motion-transmitting mechanism includes a rack member and a pinion member meshing therewith rotatable in response to horizontal travel of the intermediate supporting frame of said model tracer carrying means.

6. A contour-reproducing apparatus, according to claim 5, wherein said horizontal motion-transmitting mechanism operatively interconnecting said intermediate supporting frames also includes a screw shaft member and a threaded nut member connected to the intermediate supporting frame of said pattern cutter carrying means and movable along said screwshaft member to move said intermediate supporting frame of said pattern cutter carrying means in response to motion of the intermediate supporting frame of said model tracer carrying means.

7. A contour-reproducing apparatus, according to claim 4, wherein said carrying means includes inner carriages slidably mounted on said intermediate supporting frames in directions transverse to the direction of sliding motion of said intermediate supporting frames,
wherein said horizontal motion-transmitting mechanism operatively interconnects said inner carriages, and
wherein said model tracer is mounted on one of said inner carriages and said pattern cutter is mounted on the other of said inner carriages.

8. A contour-reproducing apparatus, according to claim 1, wherein said model tracer and said rotary pattern cutter are rotatably mounted respectively on said tracer and cutter carrying means, and wherein rotary motion-transmitting mechanism operatively connects said model tracer to said pattern cutter.

9. A contour-reproducing apparatus, according to claim 1, wherein weight-counterbalancing devices are mounted on said sustaining structure and connected respectively to said tracer elevator and cutter elevator in weight-counterbalancing relationship therewith.

10. A coutour-reproducing apparatus, according to claim 9, wherein each weight-counterbalancing device includes pulleys mounted on said sustaining structure above said tracer elevator and cutter elevator and also includes counterweights and flexible force-transmitting members connected to said counterweights and extending over said pulleys to connect them with their respective elevators.

11. A contour-reproducing apparatus for cutting two opposite-hand patterns proportionately corresponding to a traced model of one hand, said apparatus comprising
a sustaining structure having laterally-spaced parallel vertical tracer and cutter elevator guideways thereon,
a tracer elevator and a cutter elevator mounted for vertical travel along said tracer and cutter elevator guideways respectively,
vertical motion-transmitting mechanism operatively connecting said tracer elevator to said cutter elevator for converting vertical motion of said tracer elevator to vertical motion of said cutter elevator in a predetermined ratio, an outer tracer supporting frame and an outer cutter supporting frame tiltably mounted on their respective elevators, tilting motion-transmitting mechanism operatively interconnecting said outer supporting frames for converting tilting motion of said outer tracer supporting frame to tilting motion of said outer cutter supporting frame in said predetermined ratio, an intermediate tracer-supporting frame horizontally slidably mounted on said outer tracer-supporting frame for travel longitudinally therealong, a pair of intermediate cutter-supporting frames horizontally slidably mounted on said outer cutter-supporting frame for travel longitudinally therealong, a horizontal longitudinal motion-transmitting mechanism operatively connecting said intermediate tracer supporting frame to said intermediate cutter-supporting frames for converting horizontal longitudinal motion of said intermediate tracer-supporting frame along said outer tracer-supporting frame to proportionate longitudinal horizontal motion of said intermediate cutter-supporting frames simultaneously in opposite directions along said outer cutter-supporting frame, tracer and cutter cross carriages horizontally slidably mounted respectively on said tracer and cutter intermediate frames for travel laterally thereacross, horizontal lateral motion-transmitting mechanism operatively connecting said tracer cross-carriage to said cutter cross carriages for converting horizontal lateral motion of said tracer cross-carriage across said intermediate tracer-supporting frame to proportionate lateral horizontal motion of said cutter cross-carriages simultaneously in the same direction across their respective intermediate cutter-supporting frames.

a model tracer and a pair of power-driven pattern cutters mounted on said tracer and cutter cross-carriages respectively, and a model holder and a pair of pattern holders disposed beneath said model tracer and said pattern cutters respectively.

12. A contour-reproducing apparatus, according to claim 11, wherein said model tracer and pattern cutters are tiltably mounted upon ther respective cross-carriages for angular tilting motion relatively thereto in directions perpendicular to the direction of tilt of said outer tracer and cutter supporting frames, and wherein said tracer and cutter are operatively interconnected by tracer tilt-transmitting mechanism including gearing operatively connected to said model tracer and pattern cutter respectively and flexible shafting drivingly interconnecting said gearing.

13. A contour-reproducing apparatus, according to claim 11, wherein said horizontal lateral motion-transmitting mechanism includes a pair of similarly-threaded rotary screwshafts rotatably mounted transversely of said intermediate cutter supporting frame and also includes means for simultaneously rotating said similarly threaded screwshafts in the same directions.

References Cited by the Examiner
UNITED STATES PATENTS

| | | | |
|---|---|---|---|
| 2,674,160 | 4/1954 | Martellotti | 90—13 |
| 2,831,405 | 4/1958 | Sallwey et al. | 90—13.1 |
| 2,858,743 | 11/1958 | Sallwey | 90—13.1 |

WILLIAM W. DYER, JR., *Primary Examiner.*

LEON PEAR, *Examiner.*